Nov. 3, 1925.

M. RELKIN 1,559,644

BOWL

Filed Nov. 26, 1924

INVENTOR
Morris Relkin
BY
Harry Jacobson
ATTORNEY

Patented Nov. 3, 1925.

1,559,644

UNITED STATES PATENT OFFICE.

MORRIS RELKIN, OF NEW YORK, N. Y.

BOWL.

Application filed November 26, 1924. Serial No. 752,285.

*To all whom it may concern:*

Be it known that I, MORRIS RELKIN, a citizen of the United States, residing at the city of New York, in the county of New York and State of New York, have invented certain new and useful Improvements in Bowls, of which the following is a specification.

This invention relates to bowls, such as are adapted for table use, and which are so designed as to be peculiarly suitable for ornamentation as well as for use.

My invention contemplates the provision of a simple skeleton stand and spoon holder in which the parts are adapted for economical manufacture and assembly in large quantities, and in which the container or bowl member is exposed to view and may be readily removed for cleansing or replacement.

In the drawings showing the preferred forms of my invention,

Figure 1:
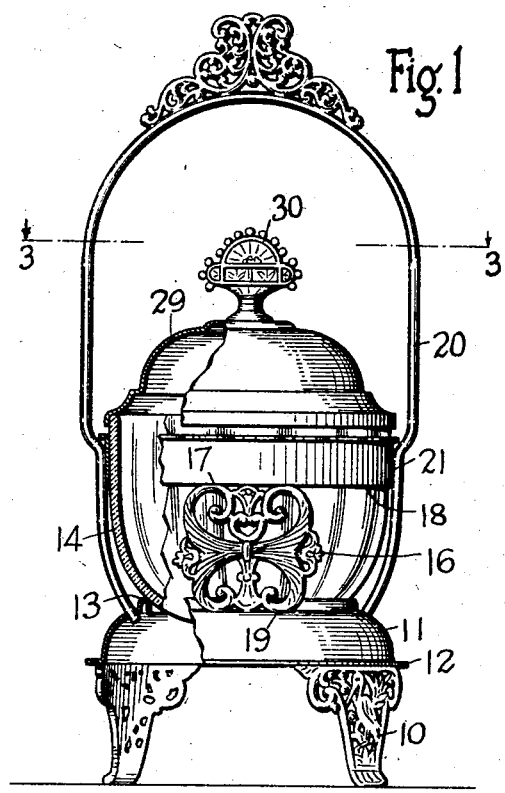
Fig. 1 is a front elevation and a partial vertical section of my invention.
Figure 2:
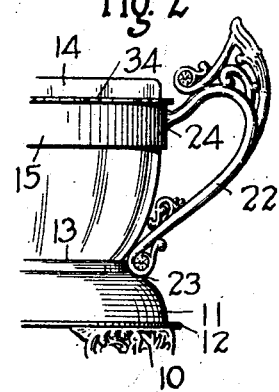
Fig. 2 is a fragmentary front elevation of a modification thereof.
Figure 4:
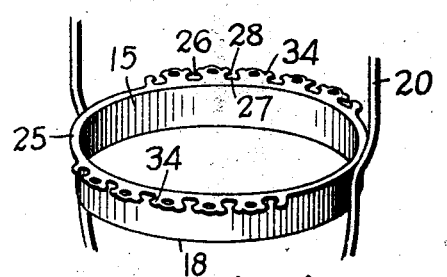
Fig. 4 is a perspective view of the spoon and bowl support.
Figure 3:
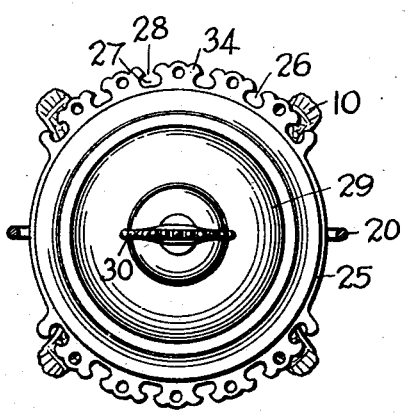
Fig. 3 is a plan view and horizontal section on the line 3—3 of Fig. 1.

In that embodiment of my invention illustrated, the skeleton stand includes the legs 10 to which is secured the lower bowl support 11. The ornamental legs 10 are preferably made separtely from the remainder of the stand and may be cast, pressed or otherwise formed. The lower support 11 is preferably spun or stamped from sheet material and has a horizontally projecting flange 12 outstanding from the lower edge thereof to which the upper suitably curved ends of the legs 10 may be soldered or otherwise secured. At the upper edge of the stand member 11, is provided the rim 13. Said rim is turned over to form a round edge portion at the top thereof on which the bottom of the glass bowl 14 may rest. The said bowl is designed to be readily removed from and replaced in the stand therefor, so that it may be quickly and easily cleaned when desired, or replaced if broken. To maintain the upper end of the bowl 14 in position, a preferably cylindrical support therefor as 15 is arranged in spaced relation to the lower support 11 as by means of the ornamental connecting members 16. Said members 16 may be cast or pressed with the design therein and are preferably soldered or otherwise secured at their upper edges 17 to the lower edge 18 of the support 15 and are further secured at their lower edges 19 to the support 11. Two of said spacing or connecting members 16 are preferably used, and are preferably arranged diametrically opposite each other. To aid in securing the member 18 in position, I provide a handle as 20, (Fig. 1) preferably of round wire, secured at its lower end to the lower support 11 and secured further at points 21 intermediate of the ends thereof to the support 15, said handle being arranged substantially 90 degrees from the connecting member 16. In the modified form of my invention shown in Fig. 2, I substitute for the single long wire handle 20, a pair of comparatively short handles as 22 secured to the support 11 at 23 and to the upper support 15 at 24.

The combined upper bowl support and spoon holder 15 is provided with a pair of outstanding flanges as 34, said flanges each being of less circumference than half that of the support 15, whereby a substantially unflanged portion 25 is provided which separates said flanges. The handles 20 or 22 may be secured at substantially the middle of said portion 25, whereby said handles do not interfere with the hanging of spoons in place on said flanges 34. Said flanges are preferably of the same thickness of material throughout as the remainder of, and are suitably struck from, the support 15, and have a series of openings 26 therein, in which spoons may be hung. The inner portion of each of the perforations 26 is wider than the outer portion 28 thereof, so that the spoon may be slipped into the opening sidewise and then turned to assume its suspended position, or the narrowest part of the spoon may be slipped through the opening 28 inwardly to the opening 26 and the spoon allowed to drop until a portion thereof wider than the opening 26 engages the flange 34. The inner cylindrical surface of the support 15 serves also to maintain the transparent bowl 14 in position. A cover as 29, preferably spun from sheet metal is adapted to fit over the upper rim of the bowl 14 and is surmounted by an ornamental handle as 30 preferably soldered to said cover at the top thereof.

It will be seen that I use a minimum number of parts and a minimum quantity of material in the manufacture of my improved utensil, that the parts thereof are simple, well adapted for ornamentation, for economy and ease of manufacture and assembly, and that many of the parts are peculiarly adapted for the double purpose of structural simplicity and ornamental effect.

I claim:

1. A utensil of the character described comprising a stand, a sheet metal lower support forming part of said stand, a substantially horizontal outstanding flange on said support, legs attached to and curved to fit the periphery of said flange, an upper cylindrical support in said stand, a substantially horizontal slotted flange outstanding from and integral with said upper support adapted to have spoons suspended in the slots thereof, connecting members in said stand joining said upper and lower supports in spaced relation, handle members for said stand directly connected to and aiding in maintaining said upper and lower supports in spaced relation, and a removable bowl maintained in position in said stand by said supports.

2. In a utensil of the character described, a skeleton stand, and a bowl support in said stand comprising a cylindrical portion, and a pair of spaced flanged portions, each of less length than half the circumference of said cylindrical portion, bent substantially at right angles from and integral with the upper edge of said cylindrical portion, having a series of slots therein extending inwardly from the peripheral edge of said flanged portion, each of said slots being wider at the inner part thereof than at the outer part thereof and adapted to have spoons inserted therein for suspension by said flanged portion, and means of less width than the circumference of said stand for maintaining said support at the upper end of said stand.

3. In a utensil of the character described, a skeleton stand comprising a set of metal lower supports, legs curved to fit and secured to the periphery of said support, an upper bowl support comprising a cylindrical portion and a pair of spaced flanged portions, bent substantially at right angles from and integral with the upper edge of said cylindrical portion, said flanged portions each having a series of slots therein extending inwardly from the peripheral edge of said flanged portion, each of said slots being wider at the inner part thereof than at the outer part thereof and adapted to have spoons inserted therein for suspension by said flanged portion, connecting members of less width than the circumference of said stand joining said upper and lower supports in spaced relation, handle members for said stand connected to and aiding in maintaining said upper and lower supports in spaced relation, and a removable transparent bowl maintained in position in said stand by said supports and visible between said supports and said connecting members.

MORRIS RELKIN.